(12) United States Patent
Miura (10) Patent No.: US 9,389,389 B2
(45) Date of Patent: Jul. 12, 2016

(54) LENS APPARATUS AND IMAGE PICKUP APPARATUS INCLUDING THE SAME

(71) Applicant: CANON KABUSHIKI KAISHA, Tokyo (JP)

(72) Inventor: Atsushi Miura, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 1 day.

(21) Appl. No.: 14/471,603

(22) Filed: Aug. 28, 2014

(65) Prior Publication Data

US 2015/0062423 A1 Mar. 5, 2015

(30) Foreign Application Priority Data

Sep. 3, 2013 (JP) ................................. 2013-181909

(51) Int. Cl.
*H04N 5/225* (2006.01)
*G02B 7/04* (2006.01)
*G02B 7/08* (2006.01)
*G02B 7/10* (2006.01)

(52) U.S. Cl.
CPC .. *G02B 7/04* (2013.01); *G02B 7/08* (2013.01); *G02B 7/102* (2013.01); *H04N 5/2254* (2013.01)

(58) Field of Classification Search
CPC ............... G02B 7/04; G02B 7/06; G02B 7/09
See application file for complete search history.

(56) References Cited

U.S. PATENT DOCUMENTS

| 6,285,511 B1* | 9/2001 | Kanayama | G02B 7/026 359/825 |
| 6,456,796 B1* | 9/2002 | Tanaka | G02B 7/10 396/31 |
| 2003/0223739 A1* | 12/2003 | Natsume | G02B 7/102 396/86 |
| 2008/0030881 A1* | 2/2008 | Okada | G02B 7/08 359/825 |
| 2014/0268375 A1* | 9/2014 | Tanaka | G02B 7/026 359/825 |

FOREIGN PATENT DOCUMENTS

| JP | 08009207 A | 1/1996 |
| JP | 2773230 B2 | 7/1998 |
| JP | 2000249896 A | 9/2000 |

* cited by examiner

*Primary Examiner* — Jason Flohre
*Assistant Examiner* — Dwight C Tejano
(74) *Attorney, Agent, or Firm* — Rossi, Kimms & McDowell LLP (57) ABSTRACT

Provided is a lens apparatus, including: a lens barrel; a movable optical member arranged in the lens barrel; and an operation ring arranged on an outer peripheral surface of the lens barrel and configured to be rotated about an optical axis when the movable optical member is to be driven in an optical axis direction, the operation ring including a plurality of gears formed about the optical axis, the plurality of gears being mutually rotated at the same cycle when the operation ring is rotated, at least one of the plurality of gears being arranged apart from an electric operation member in the optical axis direction when the operation ring is rotated by the electric operation member.

7 Claims, 8 Drawing Sheets

LENS APPARATUS AND IMAGE PICKUP APPARATUS INCLUDING THE SAME

BACKGROUND OF THE INVENTION

1. Field of the Invention

The present invention relates to a lens apparatus, and more particularly, to a lens apparatus including a movable optical member and an electric operation unit for electrically driving the movable optical member, and to an image pickup apparatus including the lens apparatus.

2. Description of the Related Art

A small-sized lens apparatus, which is mounted onto a television camera or the like in a replaceable manner, generally includes a focus ring, a zoom ring, and an iris ring. A user (camera operator) rotates and operates those operation rings, to thereby adjust a focus position, a zoom magnification, an iris value, and the like. Modes of operating a lens include a case where the user himself/herself rotates and operates the operation rings while gripping the operation rings directly by hand (manual operation mode), and a case where an electric operation unit provided integrally with the lens is driven to rotate the operation rings (electric operation mode). The above-mentioned electric operation unit includes driving motors each connected to one of the operation rings through a gear. Through operation of various switches provided outside the electric operation unit, or in response to a control signal transmitted from a camera, the driving motors are driven by a predetermined amount to rotate the operation rings.

In order to deal with the above-mentioned different image pickup modes, there is disclosed a lens apparatus in which a mechanism for switching the operation mode between manual operation mode and electric operation mode is provided in the electric operation unit.

Japanese Patent No. 2,773,230 discloses the following lens apparatus. Specifically, in the lens apparatus, a clutch mechanism is provided in the electric operation unit. The clutch mechanism is switched to change the operation mode, for zooming and focusing, between the manual operation mode and the electric operation mode performed through motor driving. With this, the lens apparatus can deal with different image pickup modes.

In recent years, the above-mentioned lens apparatus including the electric operation unit has been becoming widely used as a cinematography lens. In cinematography, focusing and fine adjustment of a zoom magnification may be sometimes performed as visual effects during the image pickup operation, and hence each operation ring is required to be manually operated with high accuracy. Accordingly, there is known such an image pickup mode that the operation ring has mounted thereonto an external rotation operation accessory capable of rotating and stopping the operation ring with finer feeding accuracy than feeding accuracy when the user rotates the operation ring while gripping the operation ring directly by hand.

However, in the related art disclosed in Japanese Patent No. 2,773,230, when the external rotation operation accessory is mounted onto the operation ring, the rotation operation accessory is arranged at a position close to another operation ring. Thus, operability of another operation ring may be deteriorated. In order to ensure operability, it is necessary to arrange the external rotation operation accessory and another operation ring at a distance from each other. However, in a case where an interval between respective operation rings is increased, a distance between connection positions, at which the respective operation rings and the electric operation unit are connected together, is increased at the same time, with the result that the electric operation unit is upsized. Further, in a case where a width of a gear of each operation ring is increased to enlarge a distance in connection position between the electric operation unit and the external rotation operation accessory, a range of processing the gear is increased, which may lead to a problem of cost increase. Further, the gear of the operation ring is shared by the electric operation unit and the external rotation operation accessory, and hence the electric operation unit and the external rotation operation accessory need to have the same gear specifications (module). As a result, there is a problem in that the related-art lens apparatus is not applicable to the rotation operation accessories having specifications different from those of the electric operation unit.

SUMMARY OF THE INVENTION

The present invention provides a lens apparatus, which includes an electric operation unit and is applicable to various types of rotation operation accessories having gear specifications different from those of the electric operation unit without deteriorating operability of other operation rings even when the external rotation operation accessory is mounted onto the lens apparatus.

According to one embodiment of the present invention, there is provided a lens apparatus, including: a lens barrel; a movable optical member arranged in the lens barrel; and an operation ring arranged on an outer peripheral surface of the lens barrel and configured to be rotated about an optical axis when the movable optical member is to be driven in an optical axis direction, the operation ring including a plurality of gears formed about the optical axis, the plurality of gears being mutually rotated at the same cycle when the operation ring is rotated, at least one of the plurality of gears being arranged apart from an electric operation member in the optical axis direction when the operation ring is rotated by the electric operation member.

According to one embodiment of the present invention, it is possible to provide the lens apparatus, which includes the electric operation unit and is applicable to various types of rotation operation accessories having gear specifications different from those of the electric operation unit without deteriorating operability of other operation rings even when the external rotation operation accessory is mounted onto the lens apparatus.

Further features of the present invention will become apparent from the following description of exemplary embodiments with reference to the attached drawings.

DESCRIPTION OF THE EMBODIMENTS

Now, exemplary embodiments of the present invention are described in detail with reference to the accompanying drawings.

First Embodiment

Now, a lens apparatus according to a first embodiment of the present invention is described in detail with reference to FIGS. 1 to 6.

Note that, this embodiment describes an example in which the present invention is applied particularly to a focus ring. Detailed description of a case of applying the present invention to another operation ring is omitted.

Figure 1:
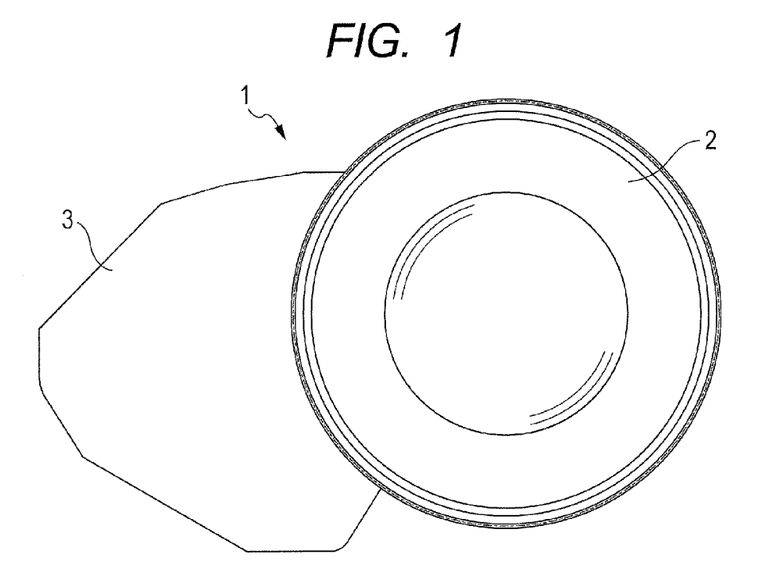
FIG. 1 is a front view of a lens apparatus according to a first embodiment of the present invention.
Figure 2:
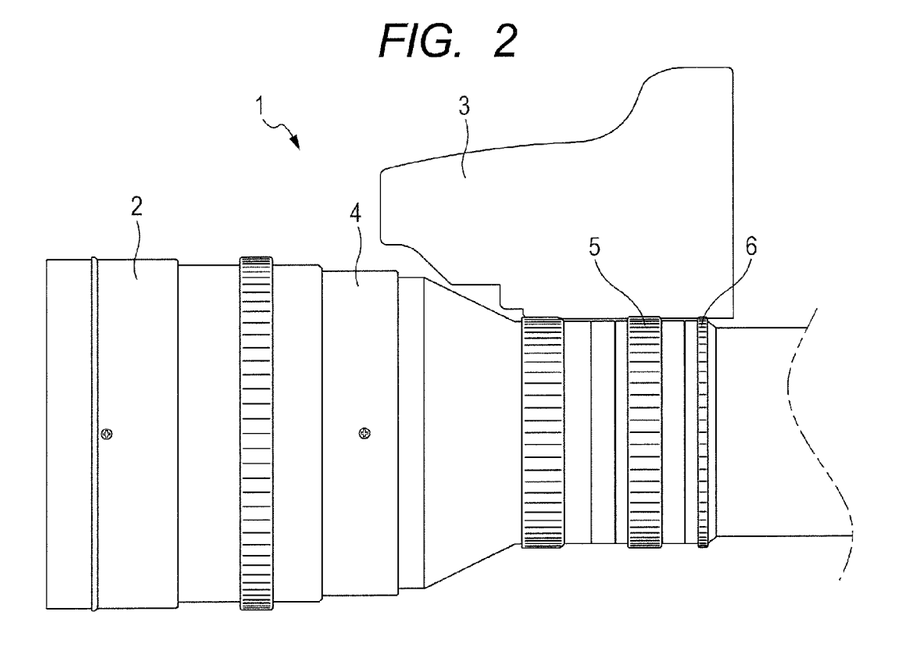
FIG. 2 is a top view of the lens apparatus according to the first embodiment.
Figure 3:
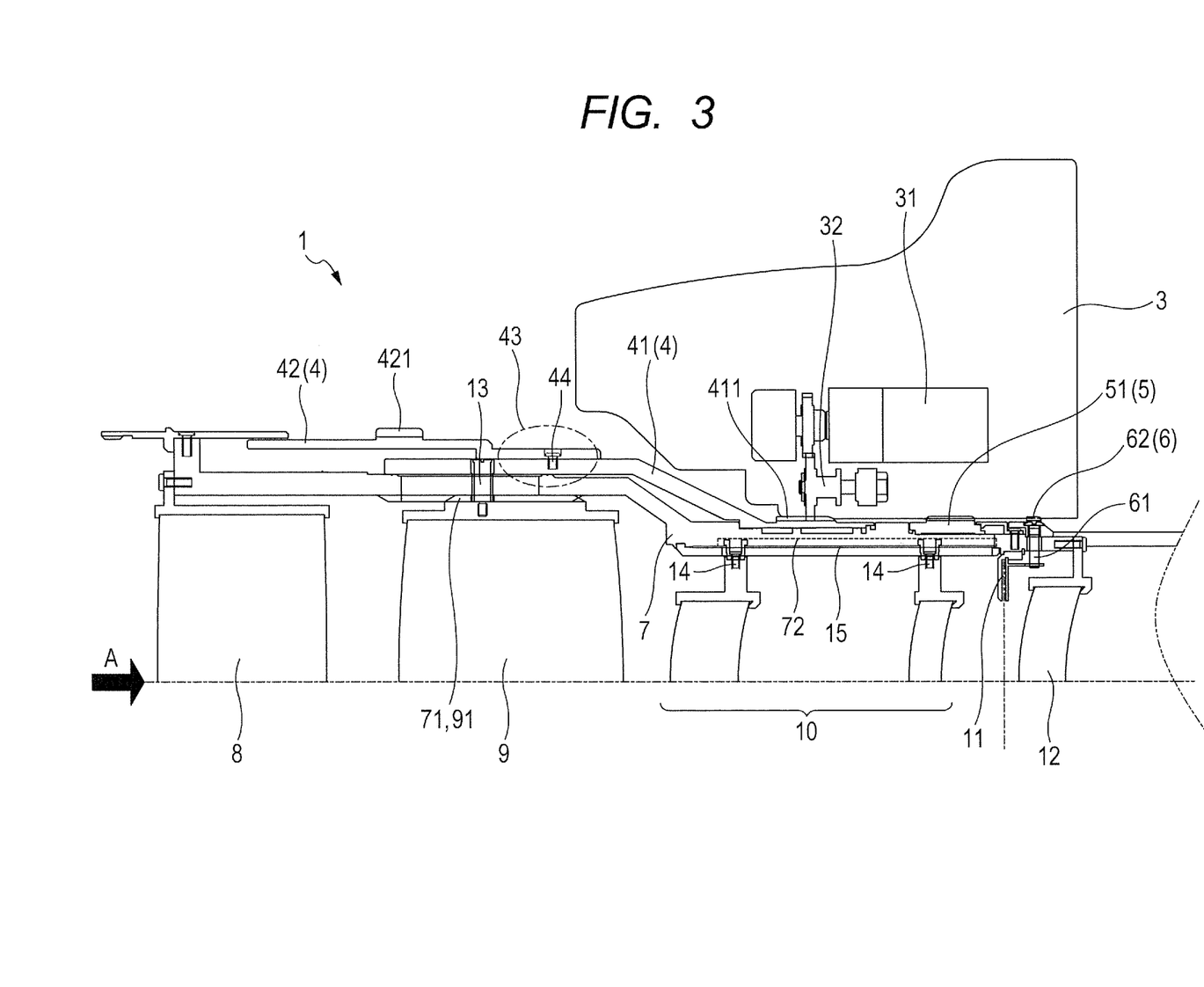
FIG. 3 is a partial cross-sectional view of the lens apparatus of FIG. 2 according to the first embodiment.

FIG. 1 is a front view of a lens apparatus 1 according to the first embodiment of the present invention. FIG. 2 is a top view of the lens apparatus 1. FIG. 3 is a partial cross-sectional view illustrating internal structure of the lens apparatus 1 of FIG. 2. Note that, for the following description, a direction of the arrow A illustrated in FIG. 3 is defined as an optical axis direction.

Structure of the lens apparatus 1 is described with reference to FIGS. 1 to 3.

The lens apparatus 1 includes a lens body 2, and an electric operation unit 3 fixed to the lens body 2, for electrically driving various operation rings that operate a movable optical member included in the lens apparatus. On an outer periphery of a lens barrel (fixed lens barrel 7) of the lens body 2, a focus ring 4, a zoom ring 5, and an iris ring 6 are provided. As illustrated in FIG. 3, the lens body 2 has such internal structure that, using the fixed lens barrel (lens barrel) 7 as a base of a structure, a fixed focus lens 8, a movable focus lens 9, a zooming unit 10, an iris 11, a relay lens 12, and the like are arranged in the stated order from a front side (an object side) to the image side of the lens apparatus 1.

The movable focus lens (movable optical member) 9 is coupled at a screw portion 91 to a screw portion 71 of the fixed lens barrel 7, and is connected to the focus ring 4 through intermediation of a connection pin 13. When the focus ring 4 is turned, the movable focus lens 9 is screw-fed in the optical axis direction with respect to the fixed lens barrel 7, and thus focus adjustment is performed.

The focus ring 4 includes: a first ring member (gear forming member) 41 including a first gear 411 that is provided on an outer peripheral surface of the first ring member 41 formed about the optical axis; and a second ring member (gear forming member) 42 including a second gear 421 that is arranged apart from the first gear 411 in the optical axis direction and provided on an outer peripheral surface of the second ring member 42 formed about the optical axis. The first ring member 41 and the second ring member 42 are fitted to each other at a connection portion 43 in a radial direction, and are fastened to each other with a screw 44 (fastening member). With this, the first ring member 41 and the second ring member 42 are always rotated integrally at the time of normal operation.

The first ring member 41 and the second ring member 42 are only fitted to each other in the radial direction, and hence the second ring member 42 can be replaced with respect to the first ring member 41 through removal of the screw 44.

The zooming unit 10 includes a plurality of supporting rollers 14 provided to each component of the zooming unit 10. The supporting rollers 14 are engaged in a straight groove 72 formed in the fixed lens barrel 7, and are guided in the optical axis direction. Further, at the same time, the supporting rollers 14 are engaged also in a curved groove (not shown) formed in a cam ring 15. The zoom ring 5 and the cam ring 15 are connected to each other by a connection pin (not shown). The zoom ring 5 is rotated, and thus also the cam ring 15 is integrally rotated. While supported by the supporting rollers 14 provided to each component of the zooming unit 10, the zooming unit 10 is moved in the optical axis direction along a cam lift of the curved groove formed in the cam ring 15. In this manner, zoom adjustment is performed.

Further, the iris 11 is connected to the iris ring 6 by a connection pin 61. The iris ring 6 is turned, and thus an aperture diameter of the iris 11 is changed.

The electric operation unit 3 is fixed onto the lens body 2 with a screw (not shown). A focus driving motor 31, a zoom driving motor (not shown), and an iris driving motor (not shown) are built in the electric operation unit 3. When the electric operation unit 3 is fixed onto the lens body 2, the focus driving motor 31 can be engaged with the first gear 411 of the focus ring 4 through intermediation of a gear transmission mechanism 32. Although not shown, through intermediation of the gear transmission mechanism 32, the zoom driving motor can be engaged with a gear 51 of the zoom ring 5, and the iris driving motor can be engaged with a gear 62 of the iris ring 6. Accordingly, the driving motors can drive and operate the operation rings. Further, the electric operation unit 3 accommodates therein a clutch mechanism (not shown) for disconnecting each driving motor and the gear transmission mechanism from each other, a central processing unit (CPU) for controlling the motor and the like, a memory that stores therein a program and data necessary for control, a sensor, etc.

Next, a method of operating the focus ring of the lens apparatus is described.

First, a case of manual operation mode of the focus ring 4 is described. To begin with, a user switches the clutch mechanism (not shown) provided to the electric operation unit 3, to thereby disconnect the focus driving motor 31 and the gear transmission mechanism 32 from each other. Next, the user directly grips the focus ring 4 and performs turning operation. The focus driving motor 31 and the focus ring 4 are disconnected from each other as described above, and thus without influence of the focus driving motor, the user can turn the focus ring at desired rotation torque suitable for manual operation mode. Even in a state in which the electric operation unit 3 is mounted onto the lens body 2 and the gear transmission mechanism 32 is engaged with the first gear 411 (one of the two gears provided on the operation ring), the second gear 421 (another one of the two gears) does not interfere with the electric operation unit 3 in the optical axis direction (the second gear 421 does not overlap the electric operation unit 3 in a direction perpendicular to the optical axis). This configuration enables the user to perform manual operation mode while the electric operation unit 3 is mounted onto the lens body 2.

Meanwhile, in a case of electric operation mode of the focus ring 4, the focus driving motor 31 and the gear transmission mechanism 32 are connected to each other by the clutch mechanism (not shown). The user operates an operation switch of the electric operation unit 3 or an accessory mounted to the electric operation unit 3, and thus drives the focus driving motor by a predetermined amount, to thereby rotate and operate the focus ring 4.

Figure 4:
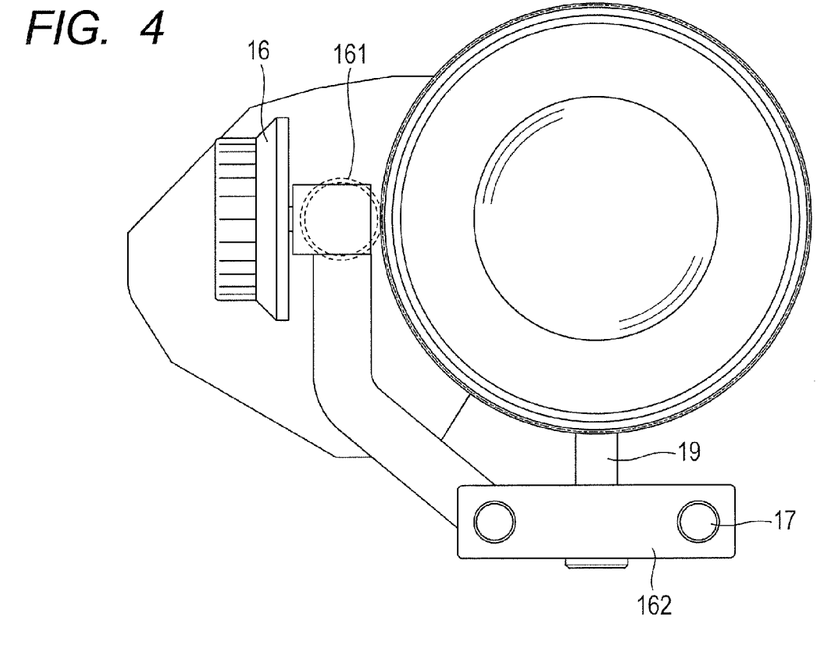
FIG. 4 is a front view illustrating a case where an external rotation operation accessory is mounted onto the lens apparatus.
Figure 5:
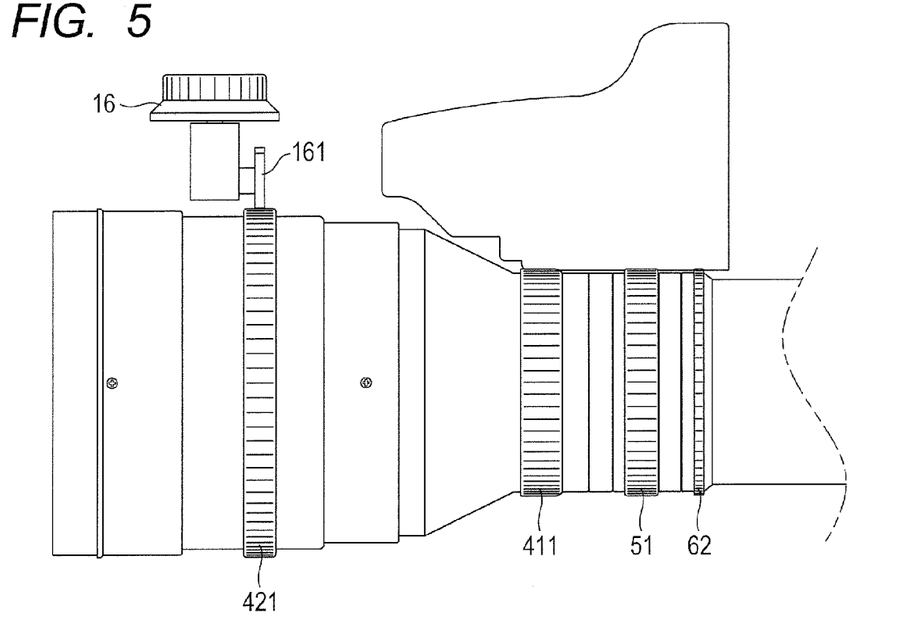
FIG. 5 is a top view illustrating the case where the external rotation operation accessory is mounted onto the lens apparatus.
Figure 6:
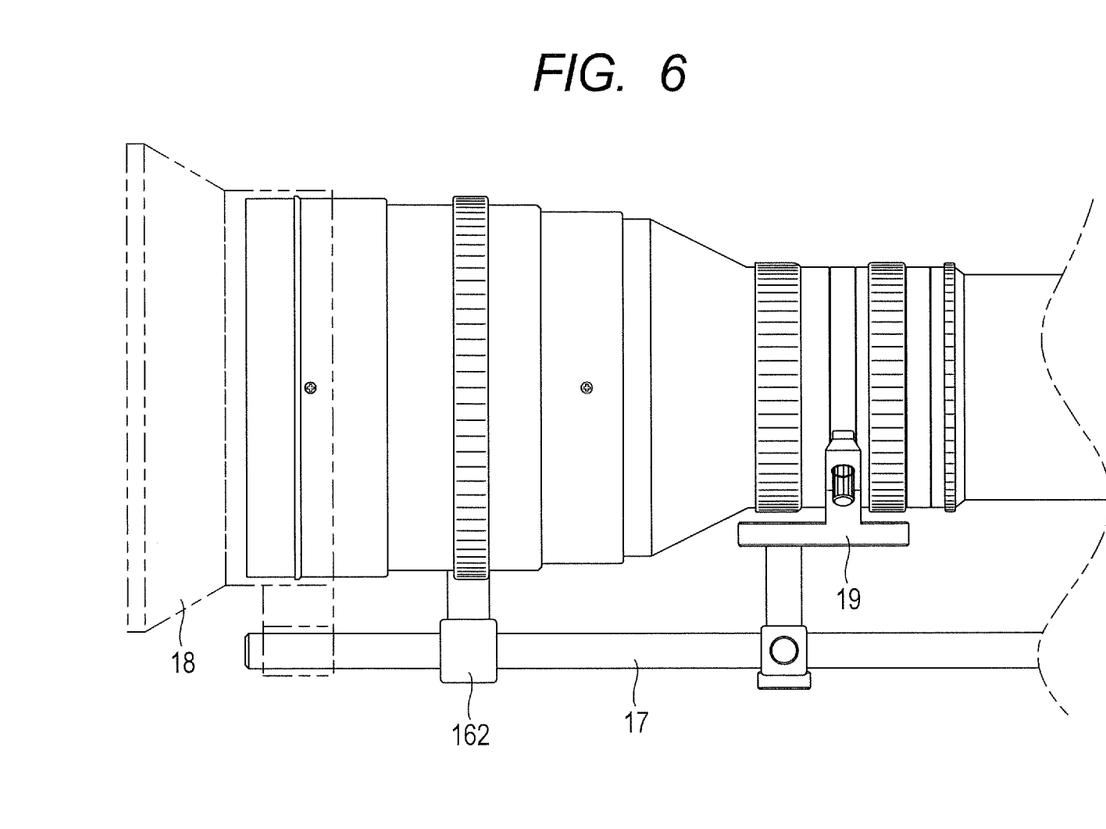
FIG. 6 is a side view illustrating the case where the external rotation operation accessory is mounted onto the lens apparatus.

Next, an operation method in a case of mounting an external rotation operation accessory (rotation operation member) 16 onto the lens apparatus 1 is described with reference to FIGS. 4 to 6. FIG. 4 is a front view illustrating a case where the external rotation operation accessory is mounted onto the lens apparatus. FIG. 5 is a top view illustrating the case where the external rotation operation accessory is mounted onto the lens apparatus. FIG. 6 is a side view illustrating the case where the external rotation operation accessory is mounted onto the lens apparatus.

The rotation operation accessory 16 assists the user in turning the operation ring at the time of manual operation mode, and enables the user to rotate and operate the focus ring 4 with finer feeding accuracy than feeding accuracy when the user rotates the focus ring 4 while gripping the focus ring 4 directly by hand. The external rotation operation accessory 16 is provided as such a mechanism as to transmit a rotational force thereof to the gear of the focus ring 4 through intermediation of a connection gear 161 when the rotation operation accessory 16 is rotated and operated.

A method of mounting the external rotation operation accessory 16 onto the lens apparatus 1 is described.

The rotation operation accessory 16 is fixed through intermediation of a mounting attachment 162 to a camera plate (not shown) or two bar members 17 extending from a tripod. After the rotation operation accessory 16 is mounted onto the bar members 17, a position of the rotation operation accessory 16 is adjusted in the optical axis direction and in the direction perpendicular to the optical axis, and the second gear 421 of the focus ring 4 and the connection gear 161 are engaged with each other. In the above-mentioned manner, connection between the rotation operation accessory 16 and the focus ring 4 is completed. Note that, onto the bar members 17, there can be mounted functional accessories capable of imparting various types of functions, such as a matte box 18 indicated by the chain double-dashed line of FIG. 6 and used for blocking unnecessary disturbance light, and a lens support base 19 for stably supporting the lens onto a camera.

Next, a method of rotating and operating the focus ring 4 is described. First, similarly to the case of manual operation mode, the user switches the clutch mechanism (not shown) provided to the electric operation unit 3, to thereby disconnect the focus driving motor 31 and the gear transmission mechanism 32 from each other. After that, the user rotates and operates the rotation operation accessory 16, to thereby rotate the focus ring 4. Through the operation as described above, the focus ring can be operated with finer feeding accuracy than feeding accuracy at the time of manual operation mode.

As described above, the rotation operation accessory 16 can be connected to the second gear 421 arranged at a position distant from the zoom ring 5 and the iris ring 6, thereby being capable of ensuring operability of the zoom ring 5 and the iris ring 6 even in a state of mounting the rotation operation accessory 16. Further, the focus ring 4 does not have an integrated configuration but have a configuration in which the second gear 421 is replaceable with respect to the first gear 411, and hence the second ring member 42 can be replaced as appropriate for ring members having different gear specifications. Accordingly, the second ring member 42 is replaced, and thus the lens apparatus is applicable to various types of external rotation operation accessories having gear specifications different from those of the electric operation unit 3.

Further, this embodiment exemplifies the case where two gears are provided as a configuration in which the focus ring 4 includes: the first ring member 41 including the first gear 411 that is provided on the outer peripheral surface of the first ring member 41 formed about the optical axis; and the second ring member 42 including the second gear 421 that is arranged apart from the first gear 411 in the optical axis direction and provided on the outer peripheral surface of the second ring member 42 formed about the optical axis. However, the present invention is not limited thereto. The focus ring may include a plurality of, that is, at least three gears, and one of the plurality of gears may be engaged with the gear transmission mechanism 32 of the electric operation unit 3, whereas another one of the plurality of gears may be engaged with the connection gear 161 of the rotation operation accessory 16. Even with this configuration, effects of the present invention can be obtained.

Second Embodiment

Now, a second embodiment of the present invention is described in detail with reference to FIGS. 7 to 9.

Figure 7:
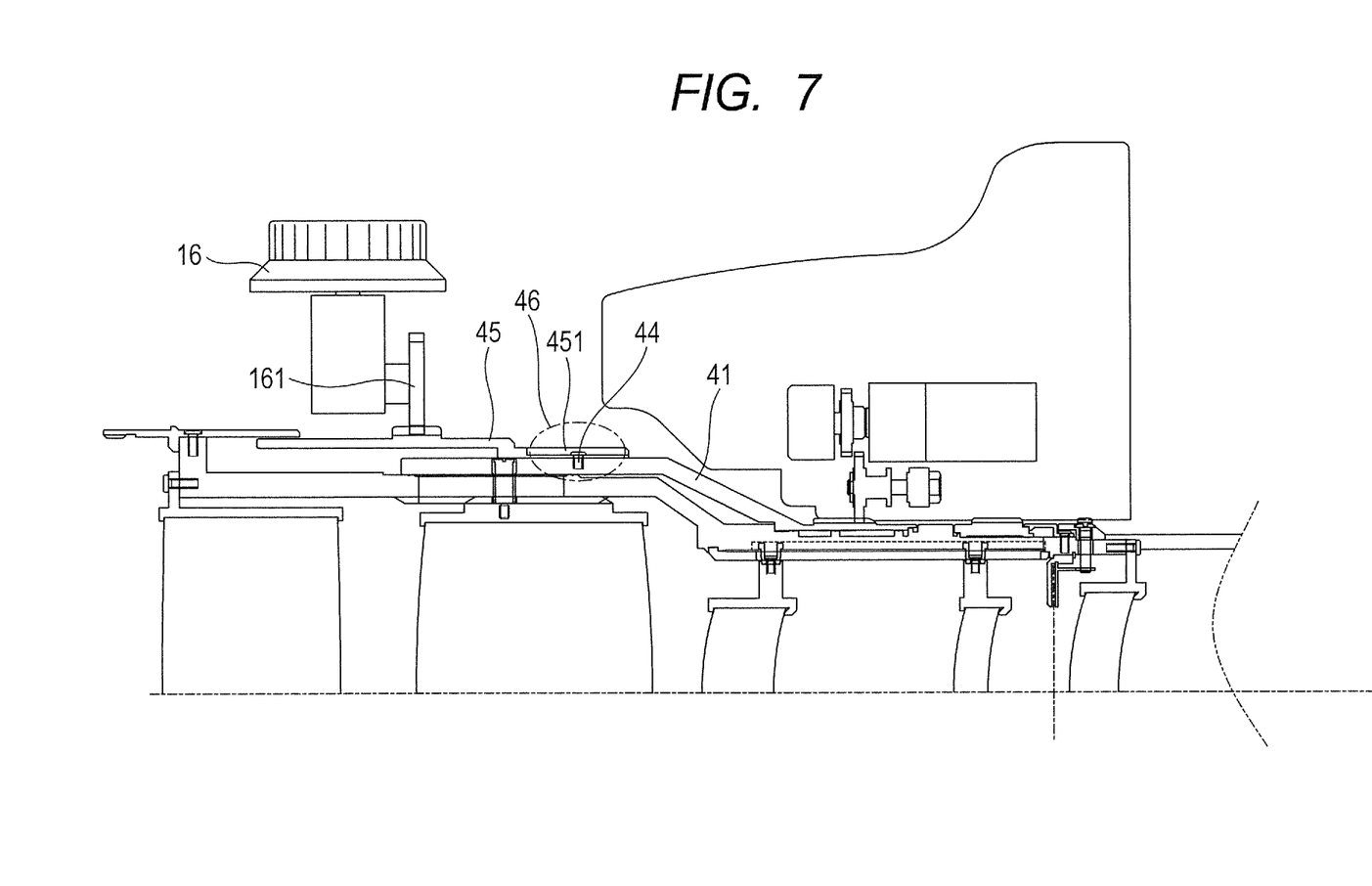
FIG. 7 is a partial cross-sectional view of a lens apparatus according to a second embodiment of the present invention.

FIG. 7 is a partial cross-sectional view of a lens apparatus according to this embodiment. FIG. 8 is an enlarged view of a focus ring connection portion according to this embodiment. FIG. 9 is a partial cross-sectional view illustrating a state in which a position of a second ring member is shifted in the optical axis direction.

Note that, in this embodiment, only matters different from those of the first embodiment are described. The same components as those of the first embodiment are denoted by the same reference symbols, and description thereof is omitted.

Figure 8:
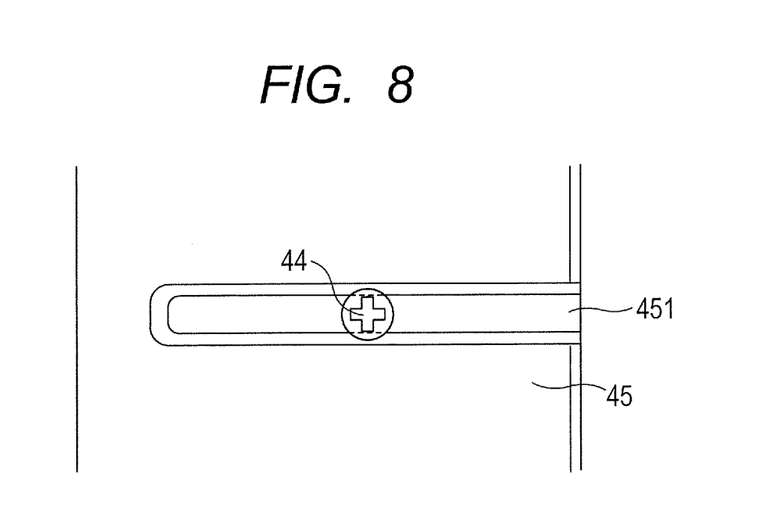
FIG. 8 is an enlarged view (viewed from an upper side of the lens apparatus of FIG. 7) of a focus ring connection portion according to the second embodiment.
Figure 9:
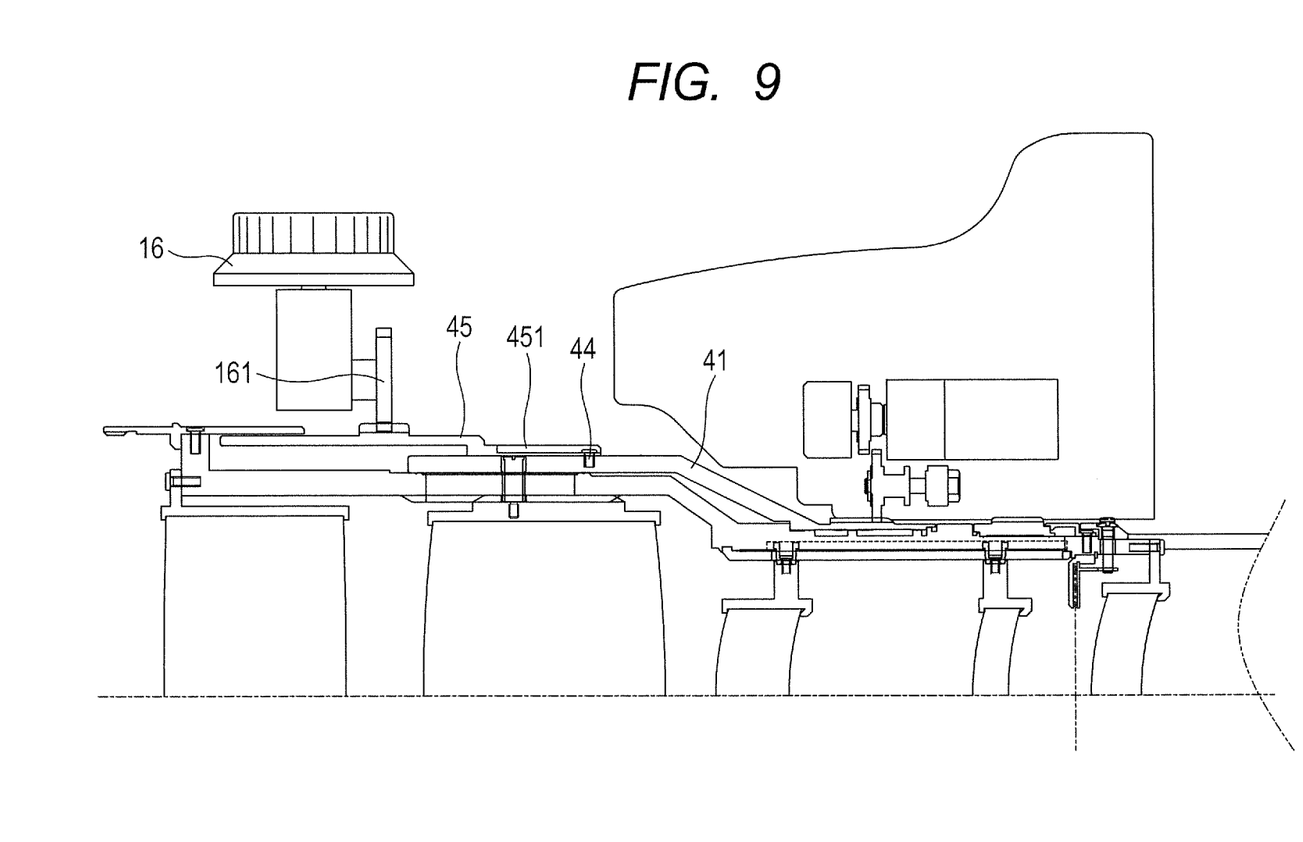
FIG. 9 is a partial cross-sectional view illustrating a state in which a position of a second ring member is shifted in an optical axis direction according to the second embodiment.

In a connection portion 46 of a second ring member (second gear forming member) 45 of the focus ring 4 according to this embodiment, there is formed an elongated groove (opening extending in the optical axis direction and passing through the second ring member 45 in the radial direction) 451 illustrated in FIG. 8. Accordingly, in a state of unfastening the screw 44, a position of the second ring member 45 in the optical axis direction with respect to the first ring member (first gear forming member) 41 can be shifted within a range of the elongated groove 451 (FIG. 9). In other words, an interval between the first gear and the second gear in the optical axis direction can be varied. That is, the elongated groove (opening extending in the optical axis direction and passing through the second ring member 45 in the radial direction) 451 and the screw 44 serve as a position shifting mechanism.

With the above-mentioned configuration, the position of the second ring member 45 in the optical axis direction is shifted, thereby being capable of shifting a position at which the rotation operation accessory 16 is fixed onto the bar members 17.

The plurality of functional accessories, such as the rotation operation accessory 16 and the matte box 18, are mounted onto the two bar members 17 within a limited range, and hence the mounting attachments sometimes interfere with each other on the bar members depending on combination of the lens and the functional accessories. The configuration according to this embodiment can shift as appropriate the position of the rotation operation accessory 16 in the optical axis direction. Accordingly, the position of the rotation operation accessory is shifted, thereby being capable of avoiding interference between the mounting attachments.

Further, in an image pickup mode of switching the operation mode between electric operation mode and operation mode performed by using the external rotation operation accessory 16, in addition to operation of the clutch of the electric operation unit 3, the position of the second ring member 45 in the optical axis direction is shifted to a position separate from the gear 161 of the rotation operation accessory 16. In this manner, switching can be performed. That is, in a case of electric operation mode, the clutch of the electric operation unit 3 is switched to a connected state, and the position of the second ring member 45 in the optical axis direction is shifted to a position at which the second gear 421 and the gear 161 of the rotation operation accessory 16 are disengaged from each other. Further, in a case of manual operation mode, the clutch of the electric operation unit 3 is switched to a disconnected state, and the position of the second ring member 45 in the optical axis direction is shifted to a position at which the second gear 421 and the gear 161 of the rotation operation accessory 16 are engaged with each other. In this manner, switching of the operation mode between the electric driving operation mode and the manual operation mode can be performed without mounting and removal of the rotation operation accessory 16.

The exemplary embodiments of the present invention are described above, but the present invention is not limited to the embodiments. Various modifications and changes may be made within the gist of the present invention.

For example, this embodiment describes the case where the present invention is applied to the focus ring. However, the present invention may be applied to the zoom ring and the iris ring. Further, although the focus ring of the embodiments 1 and 2 includes two ring members as the gear forming members (the first ring member and the second ring member), the present invention is not limited thereto but the focus ring may include a single ring member. Further, this embodiment exemplifies the case where the electric operation unit is always mounted onto the lens body. However, the prevent invention may be applied also to a case where the electric operation unit is removed from the lens body. Further, the manual operation mode is exemplified as a method of operating the rotation operation accessory. However, the present invention may be applied to a rotation operation accessory that rotates electrically.

Figure 10:
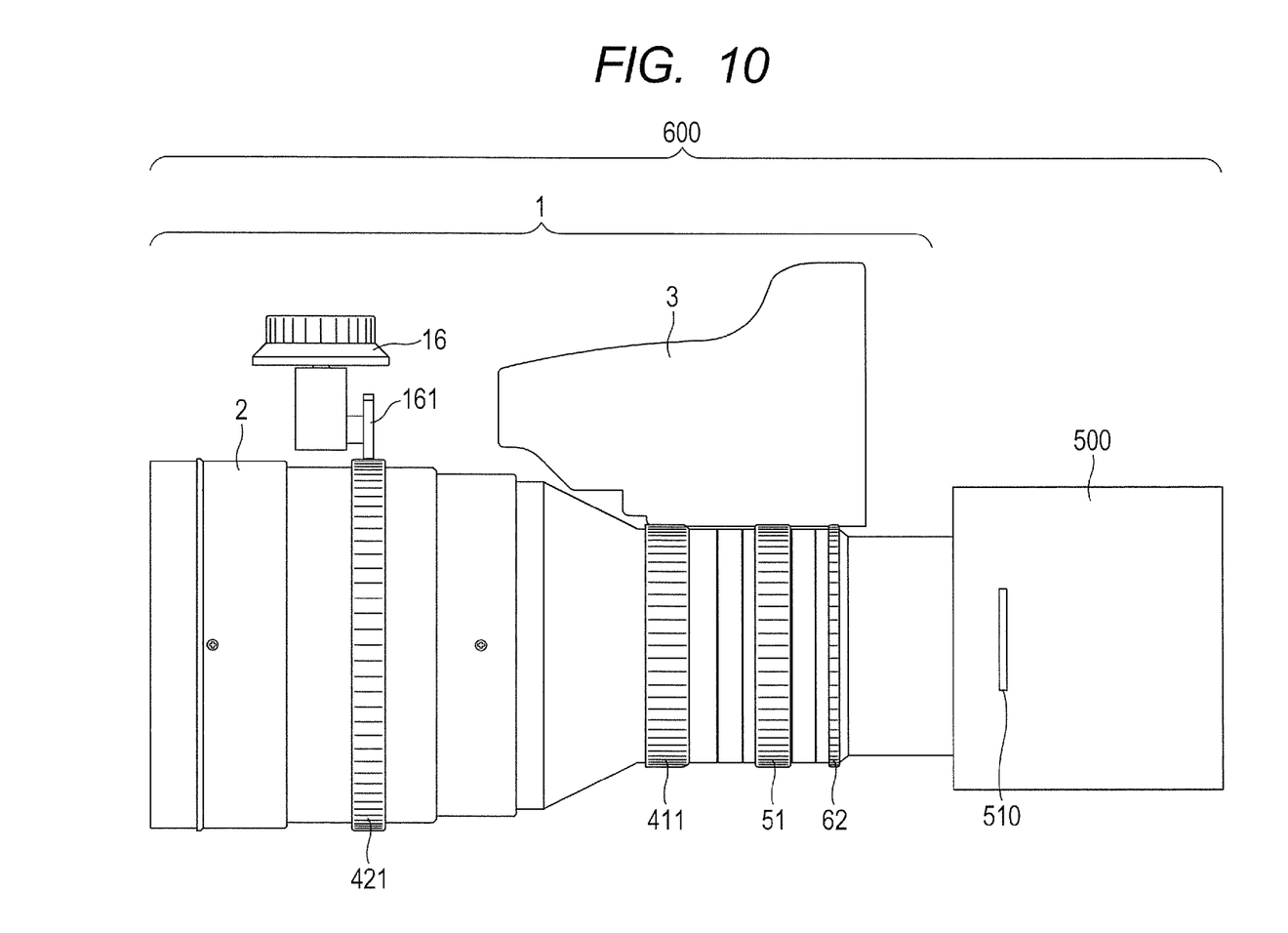
FIG. 10 is a top view of an image pickup apparatus including the lens apparatus according to the present invention.

Note that, FIG. 10 illustrates an image pickup apparatus 600 including the above-mentioned lens apparatus 1 according to the present invention and a camera apparatus 500. The camera apparatus 500 includes an image pickup device 510 for photoelectrically converting an optical image formed by the lens apparatus 1. With this configuration, it is possible to provide the image pickup apparatus 600 that is excellent in versatility and operability and is applicable to various types of rotation operation accessories having gear specifications different from those of the electric operation unit 3 without deteriorating operability of other operation rings even when the external rotation operation accessory is mounted onto the lens apparatus including the electric operation unit 3.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-181909, filed Sep. 3, 2013, which is hereby incorporated by reference herein in its entirety.

What is claimed is:

1. A lens apparatus comprising:
   a lens barrel;
   a movable optical member arranged in the lens barrel; and
   an operation ring arranged on an outer peripheral surface of the lens barrel and configured to be rotated about an optical axis to drive the movable optical member in an optical axis direction,
   wherein the operation ring includes a plurality of gears formed about the optical axis on the outer peripheral surface of the operating ring,
   wherein the plurality of gears rotate together about the optical axis when the operation ring is rotated,
   wherein one of the plurality of gears is configured to engage with a gear of an electric operation member that is detachably mountable to the lens apparatus and drive the operation ring,
   wherein another gear, among the plurality of gears, does not engage with the gear of the electric operation member, and
   wherein a position of the another gear and a position of the electric operation member are disposed spaced apart from each other in the optical axis direction when the electric operation member is attached to the lens apparatus.

2. The lens apparatus according to claim 1, wherein:
   the plurality of gears are respectively formed on a plurality of gear forming members different from each other, and
   one of the plurality of gear forming members includes a position shifting mechanism configured to shift a position of the one gear forming member in the optical axis direction.

3. The lens apparatus according to claim 2, wherein the position shifting mechanism comprises:
   an opening formed in one of a first gear forming member, among the plurality of gear forming members, on which the one gear is formed or a second gear forming member, among the plurality of gear forming members, on which the another gear is formed, the one of the first gear forming member or the second gear forming member being an outward gear forming member in a state in which the first gear forming member and the second gear forming member are fitted to each other, the opening extending in the optical axis direction and passing through the outward gear forming member in a direction perpendicular to the optical axis; and
   a fastening member fastening the first gear forming member and the second gear forming member together through the opening in the state in which the first gear forming member and the second gear forming member are fitted to each other.

4. The lens apparatus according to claim 2, wherein one of the plurality of gear forming members is replaceable.

5. The lens apparatus according to claim 1, further comprising:
   a rotation operation member mountable onto the lens apparatus, for manually operating the operation ring,
   wherein the rotation operation member comprises a gear that is engaged with the another gear to enable the operation ring to be manually operated, and
   wherein the position of the another gear is shifted in the optical axis direction so that, while the rotation operation member is mounted onto the lens apparatus, the gear of the rotation operation member becomes disengaged from the another gear.

6. The lens apparatus according to claim 1, wherein the another gear does not overlap with the electric operation member in a direction perpendicular to the optical axis when the operation ring is operated to rotate by the electric operation member.

7. An image pickup apparatus comprising:
a lens apparatus; and
a camera apparatus connected to the lens apparatus, the camera apparatus comprising an image pickup device for photoelectrically converting an optical image formed by the lens apparatus,
wherein the lens apparatus comprises:
- an operation ring arranged on an outer peripheral surface of the lens barrel and configured to be rotated about an optical axis to drive the movable optical member in an optical axis direction,
- wherein the operation ring includes a plurality of gears formed about the optical axis on the outer peripheral surface of the operating ring,
- wherein the plurality of gears rotate together about the optical axis when the operation ring is rotated,
- wherein one of the plurality of gears is configured to engage with a gear of an electric operation member that is detachably mountable to the lens apparatus and drive the operation ring,
- wherein another gear, among the plurality of gears, does not engage with the gear of the electric operation member, and
- wherein a position of the another gear and a position of the electric operation member are disposed spaced apart from each other in the optical axis direction when the electric operation member is attached to the lens apparatus.

\* \* \* \* \*